United States Patent Office 3,212,789
Patented Oct. 19, 1965

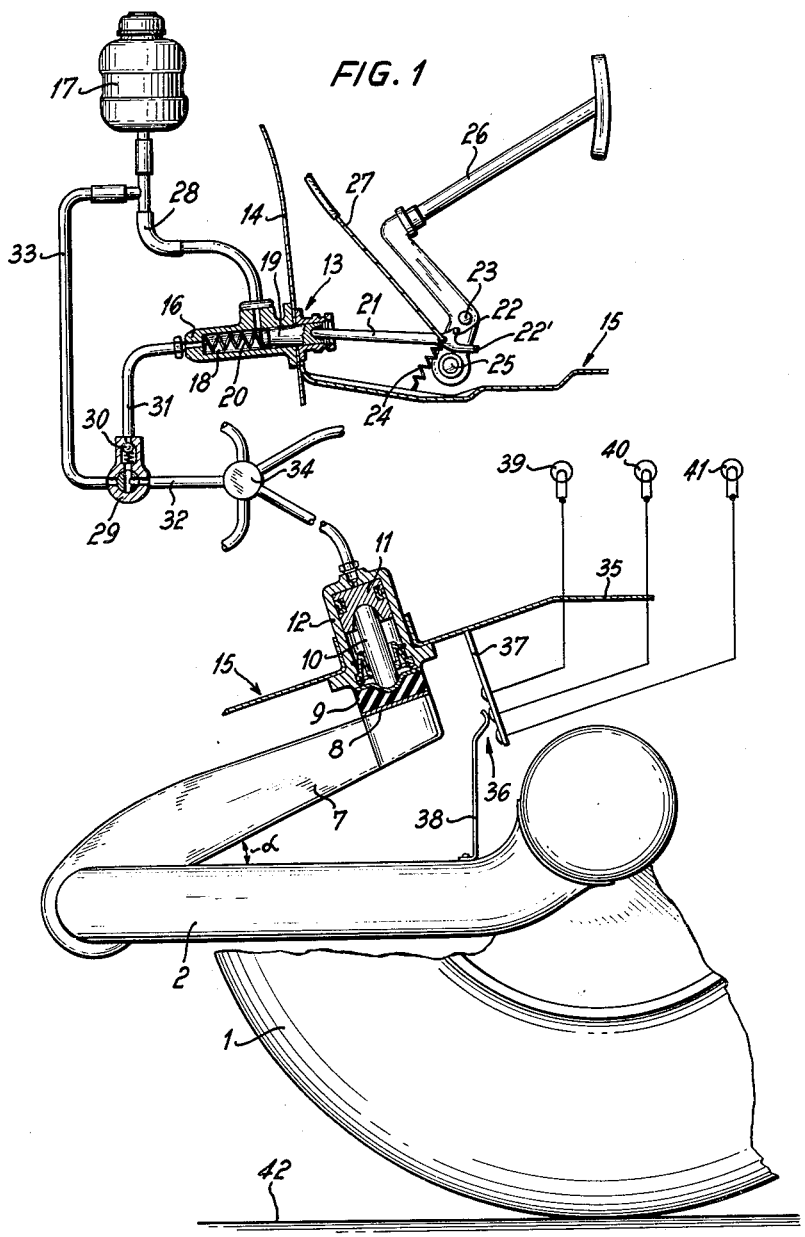

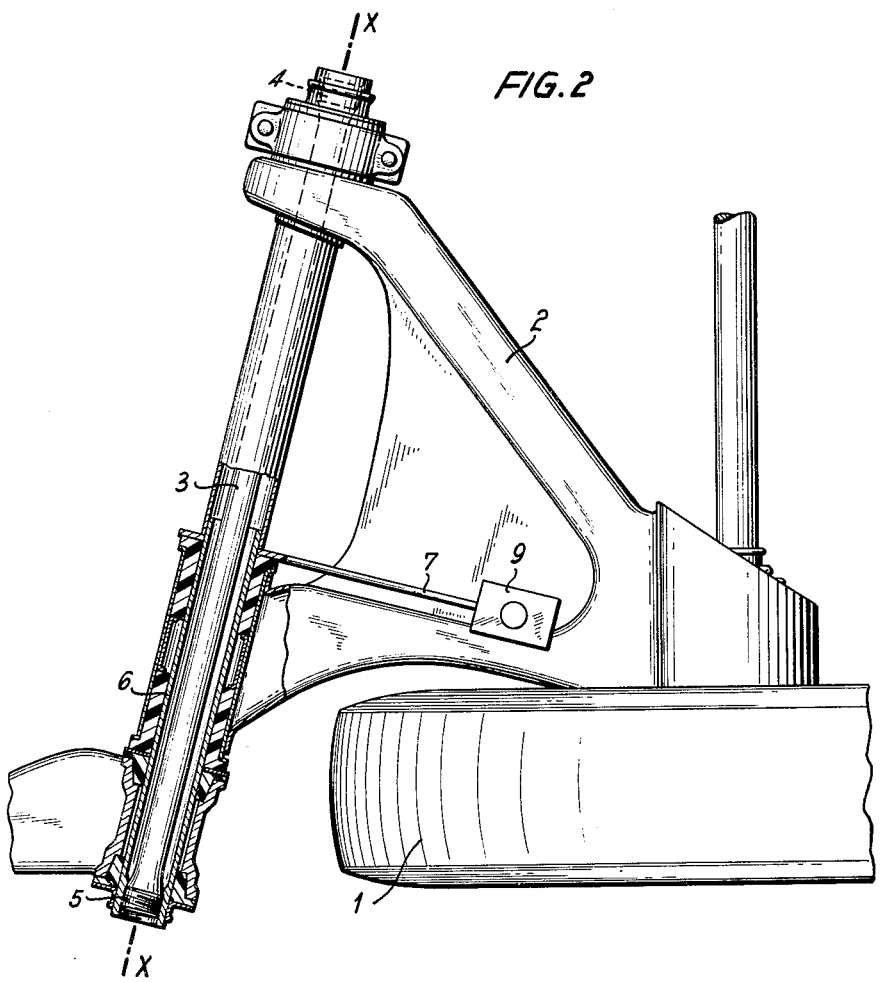

3,212,789
DEVICE FOR THE ADJUSTMENT OF THE HEIGHT OF VEHICLES, PARTICULARLY MOTOR VEHICLES
Erich Stotz, Rommelshausen, Germany, assignor to Firma Dr. Ing. h.c. F. Porsche KG, Stuttgart-Zuffenhausen, Germany
Filed Aug. 7, 1963, Ser. No. 300,427
Claims priority, application Germany, Aug. 23, 1962, P 30,079
7 Claims. (Cl. 280—124)

The present invention relates to a device for adjusting or regulating the position or height of the frame and, respectively, of the car body of vehicles, particularly motor vehicles, with respect to the road surface comprising a hydraulic cylinder for each wheel, the piston of which supports the bearing spring of the wheel, and including a pump connected in series ahead of the hydraulic cylinder for supplying pressure fluid from a storage container to the hydraulic cylinder, preferably in case of an increase in the wheel load.

In the known arrangements of this type, the adjustment or regulation of the desired level or height of the vehicle takes place automatically—in dependence upon the bearing pressure or distribution—with the aid of a correcting device and a pump driven by the swinging movements of the wheel guiding members. The correcting device is in communication with the hydraulic cylinder of each vehicle wheel by means of a distributor, and the pistons of the cylinders form in each case the abutment for the bearing springs of the wheels. If the fluid quantity which is brought into the hydraulic cylinders for a specific or given load on the wheels is changed, the abutment will be displaced and a change in the height and level of the vehicle frame will thus result therefrom. Moreover, it is known in this type of arrangement that the pump may be driven by the internal combustion engine in which case there is a continuous readiness and preparedness for a change in the height of the vehicle irrespective of the driving condition. Since, however, all of these arrangements require a costly structural expenditure or outlay for the hydraulic system, level or height regulations in small to medium-size cars could not as yet be realized because of the high costs although such an adjustment and regulation is desirable particularly for these vehicles in order to guarantee equal driving properties with a changing load.

The present invention is based on the concept of creating and proposing a level regulation, preferably for the above-mentioned type and class of motor vehicle, with a simple and cost-saving means, whereby the wheels may be adjusted for any kind of load on a predetermined mean or average swinging position and whereby, respectively, the clearance of the vehicle above the ground level may be increased, if necessary, when driving over bad roads.

In accordance with the present invention, this concept is achieved by means of a pump which is actuatable by the driver, the actuating linkage of which may be connected with one of the already existing operating levers of the motor vehicle. This results in a considerable simplification of the level or height regulation in the motor vehicle. The adjustment or regulation of the spring abutment may be attained in a particularly simple manner when a piston pump is provided for supplying the pressure fluid and the piston rod thereof may be connected with the clutch pedal of the vehicle. A commercial clutch pedal or coupling lever cylinder serves preferably as the pump.

A further reduction in cost may be attained when the movably guided piston rod is connectable or engageable with the clutch pedal against the action of a release spring by means of a cable line which is preferably operable from the instrument board, i.e., dash-controlled. A favorable connection between the pump and the operating member thereof is obtained when the free end of the piston rod is provided with fork-like projections which mesh or engage with a bolt disposed on the clutch pedal above the pivot axis thereof.

The operation or control of the adjusting device is effected by means of a three-way cock arranged between the piston pump and the hydraulic cylinder, with a check valve which blocks the reflux from the hydraulic cylinder into the pump and, respectively, frees or opens the reflux path into the storage container by bypassing the pump.

A structurally favorable arrangement is obtained for regulation of the level or height of the vehicle, when the spring suspension of the vehicle is effected by means of torsion rod springs which are provided and arranged in the axle of the wheel guiding members, if the torsion rod spring engages or acts on the piston rod of the hydraulic cylinder forming the spring abutment, via a supporting arm arranged at an angle to the wheel guiding members, through the action of a resilient intermediate body. The supporting arm which is preferably formed by a spring plate or spring leaf being upended, is connected—via a sleeve surrounding the torsion rod spring—with the clamping head of said sleeve. This results in an arrangement wherein all of the movable structural parts have a common pivot axis. Additionally, a switch may be provided between the wheel guiding member and the frame and, respectively, car body, which is connected with the electrical system of the motor vehicle and serves for indicating the normal position of the vehicle. This switch indicates to the driver the possible deviations of the vehicle as a result of different load conditions.

Accordingly, it is an object of the present invention to provide a new and improved device for regulating and/or adjusting the height of the frame, and, respectively, the car body of vehicles, particularly motor vehicles with respect to the road surface.

It is a further object of the present invention to provide such a device wherein a hydraulic cylinder, the piston of which supports the bearing spring of the wheel, is provided for each wheel and wherein a pump is connected ahead of the cylinder for supplying the pressure fluid from a storage container to the hydraulic cylinder.

An additional object of the present invention is to provide such a device in a simple and inexpensive manner.

A further object of the present invention is to provide such a simple and inexpensive device whereby the wheels may be adjusted for any kind of a load to a predetermined mean or average swinging position and/or whereby the clearance of the vehicle above the ground level may be increased, if desired.

These and other objects, features and advantages of the present invention will become more obvious from the following description when taken in connection with the accompanying drawing which shows, for purposes of illustration only, one embodiment in accordance with the present invention and wherein—

FIGURE 1 is a partial cross-sectional view of the adjusting device for a rear wheel of a motor vehicle, showing the parts of the wheel suspension in outlined form, and FIGURE 2 is a top plan view of the guidance and spring suspension of the vehicle wheel according to FIGURE 1.

Referring now to the drawing, wherein like reference numerals are used throughout the various views to designate like parts, and more particularly to FIGURE 1, each of the rear wheels of a motor vehicle, only wheel 1 of which is shown in the drawing, is guided by a guide member 2 swinging in the direction of travel of the vehicle and spring-suspended by a torsion rod spring 3 arranged in the swinging axis X—X of guide member 2. At one end 4 thereof, the torsion rod spring 3 is rigidly connected against rotation with the guide member 2 and provided with a clamping head 5 on the opposite end thereof. Connected to the clamping head 5 is a sleeve 6 which surrounds the torsion rod spring over a portion of its length and supports a supporting or bearing arm 7 on its free end which arm with the torsion rod spring means 3, 4, 5, 6 forms a bearing spring means. The supporting or bearing arm 7, which is formed or constituted by an upended spring leaf, extends vertically to the pivot axis of the guide member 2 and is hingedly connected or arranged at an angle thereto in the upward direction. The supporting or bearing arm 7 comprises a bearing or contact plate 8 to which a rubber metal body 9 is secured. Supported on that rubber metal body 9 is the movably arranged piston rod 10 of a piston 11 which glides in a hydraulic cylinder 12. A common piston pump 13 is coordinated to the hydraulic cylinders 12 of each of the wheels and flangedly connected to the pedal plate 14 of the car body 15 merely shown in outlined form. The pump 13 encloses or surrounds a cylinder 16 with a replacement chamber 18 being open toward a storage container 17, and a piston 19 which is subjected to the action of a pressure spring 20 arranged in chamber 18. On the side opposite or facing away from the displacement chamber 18, a movably arranged piston rod 21 acts on the piston 19 and the free end thereof is provided with projections 22 and 22′ arranged in a fork-like manner with respect to each other. Under the action of a release or restoring spring 24, the projection 22′ is retained on the rocking shaft 25 of the clutch pedal 26. Near the projections 22 and 22′, a cable line 27 acts on the piston rod 21 and through its intermediary the projections 22 and 22′ can be brought into operative or meshing engagement with a bolt 23 of the clutch pedal 26. The cable line 27 may be operated from the instrument panel of the vehicle (not shown).

For the purpose of controlling the fluid drawn in from the storage container 17 by the pump 13 via line 28, a three-way cock 29 is arranged between the pump 13 and the hydraulic cylinder 12 which is structurally combined with a check valve 30 to an integral unit. This three-way cock 29 connects the displacement chamber 18 with the hydraulic cylinder 12 via lines 31 and 32 and, respectively, while bypassing the pump 13, it connects the hydraulic cylinder directly with the storage container 17 via line 33. Provided within line 32 leading to the hydraulic cylinder 12 is a distributor valve 34 from which the pressure lines extend to the various hydraulic cylinders of the front axle and, respectively, to the hydraulic cylinder of the rear wheel side (not shown). The displaceable spring abutment of the front axle may be provided similarly to the rear axle as shown, or in the form of a hydraulic abutment which is combined to a structural unit with the bearing spring and the shock absorber.

A switch 36 is arranged between the bottom 35 of the vehicle body 15 and the guide member 2 near the hydraulic cylinder 12 which switch is connected to the electrical system of the vehicle. This switch 36 consists of a contact bridge 37 and a sliding contact 38, which is secured to the guide member 2. The contact bridge 37 comprises or includes three switching contacts to which control or pilot lights 39, 40 and 41 are connected. Control light 40 serves for indicating the normal position of the vehicle. The control light 39 indicates the condition which necessitates lifting of the vehicle to the normal position, while control light 41 indicates the condition which requires that the vehicle be lowered to the normal position thereof.

In the position shown in FIGURE 1, the vehicle is in the normal position thereof relative to the roadbed 42, whereby the load to be absorbed by the torsion rod spring 3 at a predetermined angular position of the bearing arm 7 relative to the guide member 2 corresponds essentially to the proper weight of the vehicle including the driver thereof. When the vehicle is taken in operation under this load condition of the wheels, the light 40 of the normal position will come on after the ignition circuit has been switched on or engaged. In order that the lights are not constantly connected to the power supply system, an interrupter switch may be disposed in the arrangement.

If the load factor is changed in the vehicle, for example, due to several additional passengers, or due to the loading of luggage, the clearance of the vehicle between the ground 35 of the vehicle body 15 and the roadbed 42 becomes smaller. At the same time, the contact bridge 37 is displaced with respect to the sliding contact 38 secured to the guide member 2, and will come to rest against the contact of light 39 which subsequently indicates to the driver that the vehicle should be lifted. For this purpose, with the vehicle in the standing position thereof, the cable line 27 is pulled whereupon the projections 22 and 22′ of the piston rod 21 will come into meshing engagement with the bolt or pin 23 of the clutch pedal 26. Upon repeatedly depressing or pushing-down the clutch pedal 26, the fluid flowing from the storage container 17 into the displacement chamber 18 will be forced to the distributor valve 34 with the aid of the piston 19, via line 31, the check valve 30, the three-way cock 29 as well as line 32, and flows from there to the various hydraulic cylinders 12. The piston 11 of the hydraulic cylinder 12 is pressed against the bearing arm 7 by the fluid, whereupon the cylinder 12 is displaced relative to the piston 11, and the vehicle is thereby lifted. The pumping movements with the clutch pedal 26 are continued for such length of time until the sliding contact 38 will once again make contact with the contact of control light 40. The check valve 30 will prevent the return or reflux of the pressure medium supplied to the hydraulic cylinder 12. If the normal position indicated by control light 40 has been achieved, the cable line 27 is released from its blocking condition on the instrument panel, whereby the release valve 24 separates the piston rod 21 from the clutch pedal. The vehicle may then be operated in the usual manner.

When the vehicle is relieved of a given additional load, the vehicle body has, of necessity, a greater clearance from the ground than is desirable. In this position, the sliding contact 38 is in communication with the contact of control light 41 which indicates to the driver that the vehicle should be lowered. For the purpose of lowering the vehicle, line 32 is connected with line 33 by means of the three-way cock 29 so that the fluid volume within the hydraulic cylinders 12 is directly released into the storage container 17 for such length of time as needed until light 40 will once again light up.

While I have shown and described one embodiment in accordance with the present invention, it is understood that the same is not limited thereto but is susceptible of many changes and modifications. For example, the present invention is not limited to the embodiment shown, nor to the type of single wheel guidance and wheel suspension employed herein. Additionally, the term "superstructure" as used herein is intended to include, for example, the vehicle frame and body. Accordingly, the present invention is susceptible of many modifications within the spirit and scope thereof and I, therefore, do not wish to be limited to the details shown and described herein but intend to cover all such changes and modifications as are encompassed by the scope of the appended claims.

I claim:

1. A device for adjusting the height of the superstructure of vehicles, particularly motor vehicles, having a plurality of wheels with respect to the road surface, comprising a bearing spring means and a hydraulic piston-cylinder unit for each wheel, the piston of said piston-cylinder unit supporting the bearing spring means of the wheel at the vehicle superstructure, and means for supplying pressure fluid to the cylinder of said piston-cylinder unit for adjusting the height of said superstructure including a storage container for said pressure fluid, a pump including a pump piston connected in series with said storage container and said piston-cylinder unit ahead of said cylinder and means for actuating said pump piston adapted to be operated by the driver including an operating linkage adapted to be operated by an existing operating lever of the vehicle, and comprising selectively controlled means selectively establishing and disestablishing an operative connection between said operating lever and said pump piston.

2. A device for adjusting the height of the superstructure of a vehicle, particularly a motor vehicle, having a clutch pedal and a plurality of wheels with respect to the road surface, comprising a bearing spring means and a hydraulic piston-cylinder unit for each wheel, the piston of said piston-cylinder unit supporting the bearing spring means of the wheel at the vehicle superstructure, and means for supplying pressure fluid to the cylinder of said piston-cylinder unit for adjusting the height of said superstructure including a storage container for said pressure fluid, a pump including a pump piston connected in series with said storage container and said piston-cylinder unit ahead of said cylinder and means for actuating said pump adapted to be operated by the driver including an operating linkage operatively connecting said pump piston with said clutch pedal of the vehicle, said operating linkage including a movably guided piston rod having one end connected to the clutch pedal against the action of a release spring by a cable line adapted to be operated from the instrument panel of the vehicle.

3. A device as defined in claim 2, wherein said one end of said piston rod has fork-like projections which are brought into meshing engagement with a bolt secured to the clutch pedal above the pivot axis thereof.

4. A device for adjusting the height of the superstructure of vehicles, particularly motor vehicles, having a plurality of spring suspended wheels with respect to the road surface, comprising a bearing spring means and a hydraulic piston-cylinder unit for each wheel, the piston of said piston-cylinder unit supporting the bearing spring means of the wheel at the vehicle superstructure, and means for supplying pressure fluid to the cylinder of said piston-cylinder unit for adjusting the height of said superstructure including a storage container for said pressure fluid, a pump including a pump piston connected in series with said storage container and said piston-cylinder unit ahead of said cylinder and means for actuating said pump piston adapted to be operated by the driver including an operating linkage adapted to be operated by an existing operating lever of the vehicle; said bearing spring means comprising a wheel guiding member for each wheel having a swinging axis, torsion rod spring means disposed along said axis, and further including a supporting arm connected thru the intermediary of said torsion rod spring means to said wheel guiding member at an angle thereto; resilient intermediate means, a piston rod for said piston of said piston cylinder means, said resilient intermediate means being engaged by said piston rod, one end of said supporting arm abutting said resilient intermediate means, the other end of said supporting arm being in operative engagement with said torsion rod spring means; said existing operating lever including a clutch pedal; said operating linkage including a pump piston rod operatively connecting said pump piston with said clutch pedal against the action of a release spring by a cable line adapted to be operated from the instrument panel of the vehicle, the clutch pedal end of pump piston rod having fork-like projections which are brought into meshing engagement with a bolt secured to the clutch pedal above the pivot axis thereof.

5. A device as defined in claim 4, further including a three-way cock and a release valve arranged in the connection between said pump and said cylinder, said cock and said valve being so arranged as to block reflux from the cylinder into the pump and, respectively, free the reflux into said container while bypassing the pump.

6. A device as defined in claim 5, wherein said supporting arm is formed by an upended leaf spring connected with a clamping head of a sleeve, said sleeve enclosing the torsion rod spring means.

7. A device as defined in claim 6, further including a switch provided between the wheel guiding member and the vehicle superstructure, said switch being connected to the electrical system for the vehicle and serving to indicate the normal position of the vehicle.

References Cited by the Examiner

UNITED STATES PATENTS

| | | |
|---|---|---|
| 1,610,754 | 12/26 | Davidson. |
| 2,191,211 | 2/40 | Krotz. |
| 2,840,390 | 6/58 | Walker. |
| 2,845,280 | 7/58 | Krotz. |

A. HARRY LEVY, *Primary Examiner.*

LEO FRIAGLIA, *Examiner.*